(12) United States Patent
Goyal et al.

(10) Patent No.: US 9,135,320 B2
(45) Date of Patent: Sep. 15, 2015

(54) SYSTEM AND METHOD FOR DATA ANONYMIZATION USING HIERARCHICAL DATA CLUSTERING AND PERTURBATION

(71) Applicant: Opera Solutions, LLC, Jersey City, NJ (US)

(72) Inventors: Kanav Goyal, Panchkula (IN); Chayanika Pragya, New Delhi (IN); Rahul Garg, Ghaziabad (IN)

(73) Assignee: Opera Solutions, LLC, Jersey City, NJ (US)

( * ) Notice: Subject to any disclaimer, the term of this patent is extended or adjusted under 35 U.S.C. 154(b) by 162 days.

(21) Appl. No.: 13/917,263

(22) Filed: Jun. 13, 2013

(65) Prior Publication Data

US 2013/0339359 A1 Dec. 19, 2013

Related U.S. Application Data

(60) Provisional application No. 61/659,178, filed on Jun. 13, 2012.

(51) Int. Cl.
*G06F 17/30* (2006.01)

(52) U.S. Cl.
CPC ................................ *G06F 17/30569* (2013.01)

(58) Field of Classification Search
CPC ....................................................... G06F 17/30
USPC ................................................. 707/600–899
See application file for complete search history.

(56) References Cited

U.S. PATENT DOCUMENTS

2013/0198188 A1* 8/2013 Huang et al. .................. 707/737

OTHER PUBLICATIONS

Dalenius, "Finding a Needle In a Haystack or Identifying Anonymous Census Records," Journal of Official Statistics, vol. 2, No. 3, 1986, pp. 329-336 (8 pages.).
Sweeney, "k-Anonymity: A Model for Protecting Privacy," International Journal on Uncertainty Fuzziness, and Knowledge-Based Systems, 10 (5), 2002, pp. 557-570 (14 pages).
Sweeney, "Achieving k-Anonymity Privacy Protection Using Generalization and Suppression," International Journal on Uncertainty, Fuzziness and Knowledge-Based Systems, 10 (5), 2002, pp. 571-588 (18 pages).
Meyerson, et al., "On the Complexity of Pptimal K-Anonymity," 23rd ACM SIGACT-SIGMOD-SIGART Symposium on Principles of Database Systems, 2004, pp. 223-228 (6 pages).
Aggarwal, et al., "Approximation Algorithms for k-Anonymity," Journal of Privacy Technology, Nov. 2005 (18 pages).

(Continued)

*Primary Examiner* — Isaac M Woo
(74) *Attorney, Agent, or Firm* — McCarter & English, LLP

(57) ABSTRACT

A system and method for data anonymization using hierarchical data clustering and perturbation is provided. The system includes a computer system and an anonymization program executed by the computer system. The system converts the data of a high-dimensional dataset to a normalized vector space and applies clustering and perturbation techniques to anonymize the data. The conversion results in each record of the dataset being converted into a normalized vector that can be compared to other vectors. The vectors are divided into disjointed, small-sized clusters using hierarchical clustering processes. Multi-level clustering can be performed using suitable algorithms at different clustering levels. The records within each cluster are then perturbed such that the statistical properties of the clusters remain unchanged.

30 Claims, 7 Drawing Sheets

(56) References Cited

OTHER PUBLICATIONS

Bayardo, et al., "Data Privacy Through Optimal k-Anonymization," Proceedings of the 21st International Conference on Data Engineering, Apr. 2005 (12 pages).
Zhong, et al., "Privacy-Enhancing k-Anonymization of Customer Data," PODS Jun. 13-15, 2005 (9 pages).
Machanavajhala, et al., "I-Diversity: Privacy Beyond k-Anonymity," Proceedings of the 22nd Conference on Data Engineering, 2006 (12 pages).
Li, et al., "t-Closeness, Privacy Beyond k-Anonymity and I-Diversity," Data Engineering, 2007 (10 pages).
Xiao, et al., "Personalized Privacy Preservation," SIGMOD Jun. 27-29, 2006 (12 pages).
LeFevre, et al., "Mondrian Multidimensional K-Anonymity," Proceedings of the 22nd International Conference on Data Engineering, 2006 (11 pages).
Kargupta, et al., "Random-Data Pertubation Techniques and Privacy-Preserving Data Mining," Knowledge and Information Systems, Sep. 2004, pp. 387-414 (28 pages).
Wilson, et al., "The Impact of Data Perturbation Techniques on Data Mining," Decision Sciences Institute 2002 Annual Meeting Proceedings, pp. 181-185 (5 pages).
Duncan, et al., "Obtaining Information While Preserving Privacy: A Markov Perturbation Method for Tabular Data," Statistical Data Protection, 1998 (12 pages).
Gouweleeuw, et al., "Post Randomisation for Statistical Disclosure Control: Theory and Implementation," Journal of Official Statistics, vol. 14, No. 4, 1998, pp. 463-478 (16 pages).

\* cited by examiner

| ZIP CODE | AGE | NATIONALITY | DISEASE |
|---|---|---|---|
| 13053 | 28 | ITALIAN | HEART |
| 13068 | 29 | BRITISH | HEART |
| 13068 | 21 | FRENCH | VIRAL |
| 13053 | 23 | BRITISH | VIRAL |
| 14853 | 50 | INDIAN | CANCER |
| 14853 | 55 | JAPANESE | HEART |
| 14850 | 47 | CHINESE | VIRAL |
| 14850 | 59 | INDIAN | VIRAL |
| 13053 | 31 | FRENCH | CANCER |
| 13053 | 37 | GERMAN | CANCER |
| 13068 | 36 | BRITISH | HEART |
| 13068 | 32 | BRITISH | CANCER |

FIG. 5

| ZIP CODE | AGE | NATIONALITY | DISEASE |
|---|---|---|---|
| 13068 | 28 | BRITISH | HEART |
| 13068 | 28 | BRITISH | HEART |
| 13068 | 28 | BRITISH | VIRAL |
| 13068 | 28 | BRITISH | VIRAL |
| 14850 | 55 | INDIAN | CANCER |
| 14850 | 55 | INDIAN | HEART |
| 14850 | 55 | INDIAN | VIRAL |
| 14850 | 55 | INDIAN | VIRAL |
| 13053 | 36 | BRITISH | CANCER |
| 13053 | 36 | BRITISH | CANCER |
| 13053 | 36 | BRITISH | HEART |
| 13053 | 36 | BRITISH | CANCER |

FIG. 6

| ZIP CODE | AGE | NATIONALITY | DISEASE |
|---|---|---|---|
| 13068 | 23 | BRITISH | HEART |
| 13053 | 21 | ITALIAN | HEART |
| 13053 | 29 | BRITISH | VIRAL |
| 13068 | 28 | FRENCH | VIRAL |
| 14853 | 50 | INDIAN | CANCER |
| 14850 | 55 | CHINESE | HEART |
| 14853 | 59 | JAPANESE | VIRAL |
| 14850 | 47 | INDIAN | VIRAL |
| 13068 | 32 | FRENCH | CANCER |
| 13053 | 31 | BRITISH | CANCER |
| 13068 | 37 | GERMAN | HEART |
| 13053 | 36 | BRITISH | CANCER |

FIG. 7

SYSTEM AND METHOD FOR DATA ANONYMIZATION USING HIERARCHICAL DATA CLUSTERING AND PERTURBATION

CROSS-REFERENCE TO RELATED APPLICATION

This application claims priority to U.S. provisional Patent Application No. 61/659,178 filed on Jun. 13, 2012, which is incorporated herein in its entirety by reference and made a part hereof.

BACKGROUND

1. Field of the Invention

The present invention relates generally to data anonymization. More specifically, the present invention relates to a system and method for data anonymization using hierarchical data clustering and perturbation.

2. Related Art

In today's digital society, record-level data has increasingly become a vital source of information for businesses and other entities. For example, many government agencies are required to release census and other record-level data to the public, to make decision-making more transparent. Although transparency can be a significant driver for economic activity, care must to be taken to safeguard the privacy of individuals and to prevent sensitive information from falling into the wrong hands. To preserve privacy, record-level data must be anonymized so that no individual can be identified from the data.

Many methods have been proposed for anonymization of data. One method for the anonymization of census data, known as attribute suppression, involves not releasing attributes that may lead to identification. However, even if direct identifiers are removed, it is still possible to isolate individuals who have unique values for the combination of all released attributes. As such, it might be possible to identify certain individuals by linking the released data to externally available datasets.

One common metric for anonymization is known as k-anonymity. K-anonymity requires that each record is the same as at least k−1 other records with respect to certain identifying attributes. One method for achieving k-anonymity, known as generalization, involves replacing values for identifying attributes by more general values to achieve k-anonymity. Research groups have analyzed the computational complexity of achieving k-anonymity, and demonstrated that it is NP-hard. Some advanced methods for attaining k-anonymity include approximation algorithms to achieve k-anonymity, optimal k-anonymity, privacy enhancing k-anonymity in distributed scenarios, personalized privacy preservation, and multi-dimensional k-anonymity.

However, achieving k-anonymity by generalization is not feasible in cases of high-dimensional datasets because there are many attributes and unique combinations even after the generalization of some attributes. It has been shown using two simple attacks that a k-anonymized dataset has some subtle, but severe, privacy problems. A powerful privacy criterion called l-diversity has been proposed that can defend against such attacks. However, research shows that l-diversity has a number of limitations and is neither necessary nor sufficient to prevent attribute disclosure. A privacy approach referred to as t-closeness has been proposed, and requires that the distribution of a sensitive attribute in any equivalence class is close to the distribution of the attribute in the overall table.

Another approach for anonymization of data involves perturbation of an entire dataset by adding random noise or swapping the values of one record with another record. This ensures that even if a unique record is isolated, it may not correspond to any real person. However, this metric destroys the correlations among different attributes, which may cause statistical inferences from the data to no longer be valid.

Thus, a need exists for a system for data anonymization that can be applied to high-dimensional data sets while maintaining statistical information at different levels of the data.

SUMMARY OF THE INVENTION

The present invention relates to a system and method for data anonymization using hierarchical data clustering and perturbation. The system includes a computer system operated by a user, and an anonymization program (or, software engine) executed by the computer system. A high-dimensional data set can provided to the system, which converts the data to a normalized vector space and applies clustering and perturbation techniques to anonymize the data. The conversion results in each record of the data set being converted into a normalized vector that can be compared to other vectors. The vectors are divided into disjointed, small-sized clusters using hierarchical clustering processes. Multi-level clustering can be performed using suitable algorithms such as k-nearest neighbor or attribute-based division, at different clustering levels. The records within each cluster are then perturbed such that the statistical properties of the clusters remain unchanged.

In one embodiment, an assign method of perturbation is applied to the disjointed clusters, so that attribute values of one record are randomly assigned to all records within each cluster, thereby resulting in k-anonymity. In another embodiment, a shuffle method of perturbation is applied to the disjointed clusters, so that the values of an attribute are shuffled among the records in each cluster by a random permutation.

In one embodiment, the entire data set is partitioned into disjointed subsets, based on particular attributes. The disjointed subsets are then broken down into clusters having a maximum defined number of records, e.g., k-records, using a distance metric. The distance metric can include different weights for particular attributes while clustering the data, so that the clusters contain closely related values for those attributes. In another embodiment, the data may be disjointed into multiple levels of clusters.

The method for data anonymization includes first inputting an original data set into a computer system. A vector space mapping program executed by the computer system processes the data set and converts it into a universal format. Fields of the original data set with categorical values are mapped to numeric fields, and each field is assigned a relative weight. Normalized vector data sets are then formed by taking the values of all the attributes and normalizing them so that the mean of all records is 0, with a variance of 1. The normalized vector data sets are compared with the original data sets to obtain mapping tables for each attribute. The normalized vector data sets are the divided into disjointed first level clusters based on at least one clustering technique. The clusters are then anonymized using a perturbation method. Once sufficiently anonymized, the clusters are combined and remapped back to the original domain of the original data set based on mapping tables. The remapped data sets are then produced by the computer system.

BRIEF DESCRIPTION OF THE DRAWINGS

The foregoing features of the invention will be apparent from the following Detailed Description of the Invention, taken in connection with the following drawings, in which:

FIG. 5 is a diagram illustrating a sample record-level dataset containing 4-sized clusters obtained after hierarchical clustering performed by the system;

FIG. 6 is a diagram illustrating a first anonymized dataset obtained after processing by the system of the dataset of FIG. 5;

FIG. 7 is diagram illustrating a second anonymized dataset obtained after processing by the system of the dataset of FIG. 5.

DETAILED DESCRIPTION OF THE INVENTION

The present invention relates to a system and method for data anonymization using hierarchical data clustering and perturbation, as discussed in detail below in connection with FIGS. 1-8.

Figure 1:
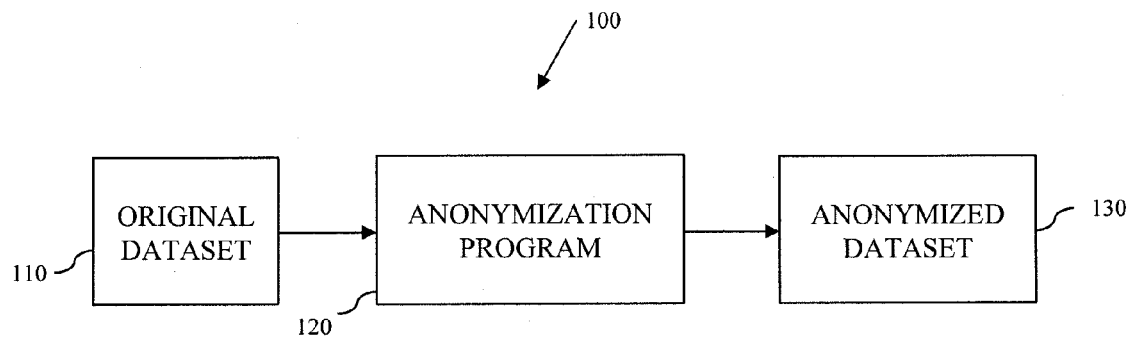
FIG. 1 is a block diagram of the system for data anonymization.

FIG. 1 is a block diagram illustrating the anonymization system 100 of the present invention. The system 100 includes an anonymization program (or, software engine) 120 which processes an original dataset 110 and produces an anonymized dataset 130. The original dataset 110 contains record-level data to be anonymized, e.g., data containing information about individuals. The anonymized dataset 130 can be released to the public without fear of sensitive data being released.

Figure 2:
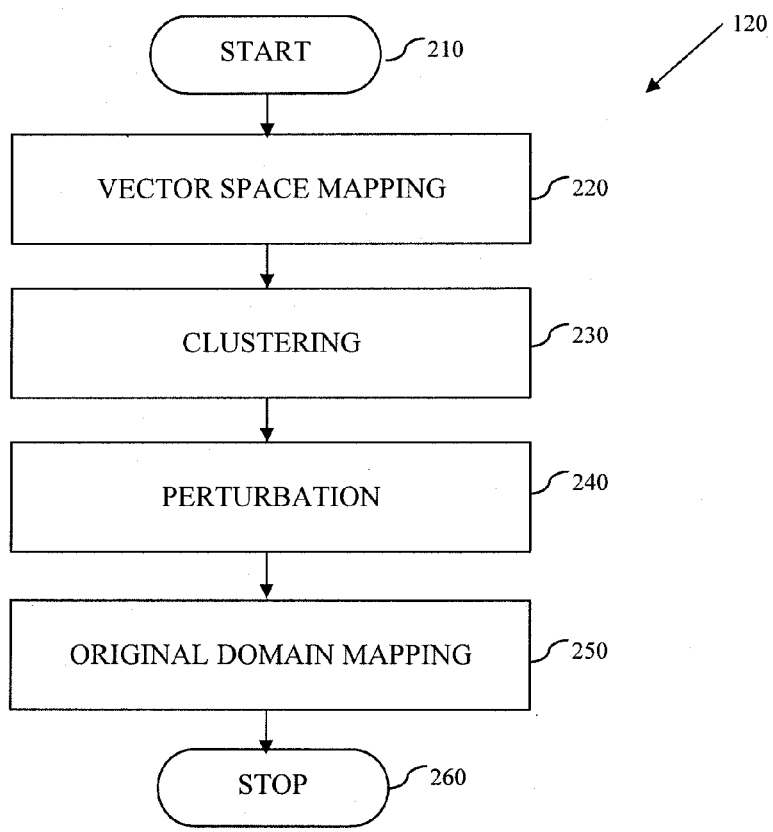
FIG. 2 is a flowchart illustrating overall processing steps of the system.

FIG. 2 is a flowchart illustrating processing steps carried out by the anonymization program 120 of the system 100. The anonymization program 120 is first initialized at start step 210, where the original dataset 110 is provided to the anonymization program 120. The original dataset 110 (which includes record-level data), is then provided to a vector space mapping program in step 220, described in greater detail below in connection with FIG. 3. The vector space mapping program converts each record to a normalized vector that can be compared to other vectors. Then, in clustering step 230, the normalized vectors are divided into disjointed k-sized groups of similar records based on hierarchical clustering techniques, which are described in greater detail in FIG. 4. The independent clusters are then processed in perturbation step 240, to obtain anonymized clusters, as discussed in greater detail in FIGS. 5-7. The anonymized clusters are then processed in original domain mapping step 250, where they are combined and remapped back to the original domain of the original data set so that they can be released to the public. The remapping can be accomplished using mapping tables obtained during the vector space mapping program in step 220. Upon completion of the original domain mapping step 250, the anonymization program 120 is complete, and the dataset is anonymized.

Figure 3:
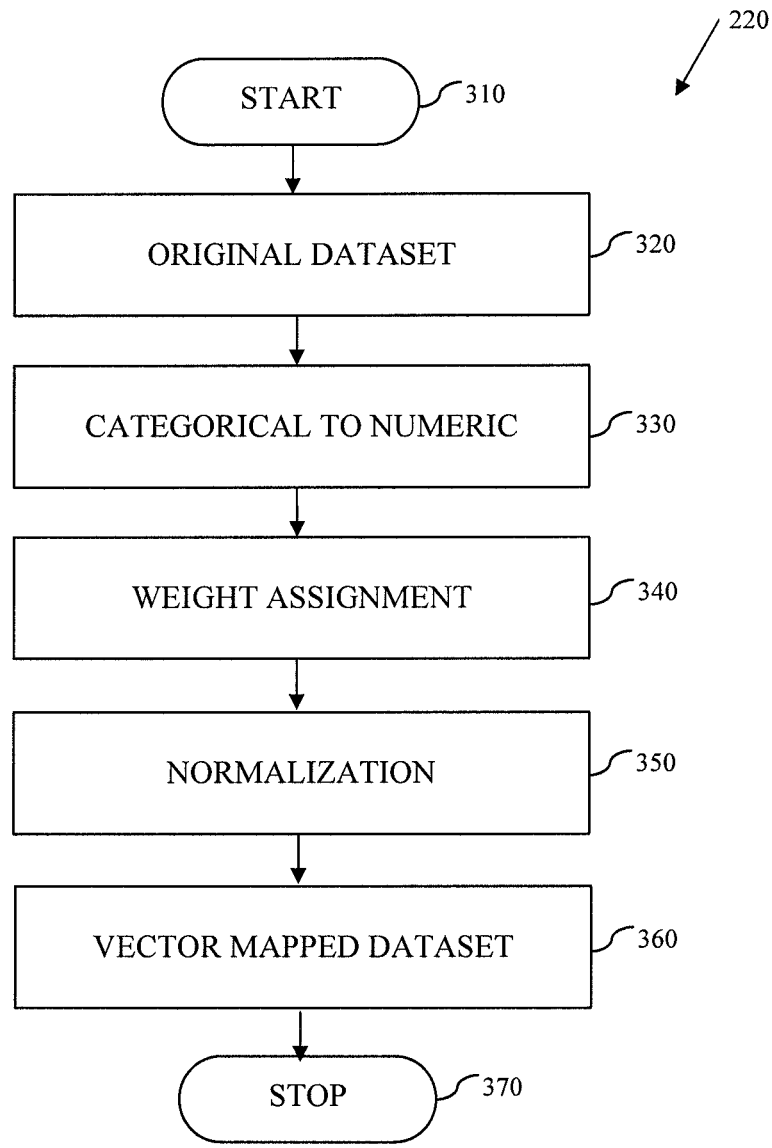
FIG. 3 is a flowchart illustrating the vector space mapping step of FIG. 2 in greater detail.

FIG. 3 is a flowchart illustrating, in greater detail, the steps of the vector space mapping program performed in step 220 of FIG. 2. In steps 310-320, an original data set, e.g., a record-level data set is selected by the system. Then, in step 330, a categorical to numeric conversion process is executed so that every record is in a format that can be compared to other records. Every field of the original data set with categorical values is mapped to numeric fields, so that distance vectors can be calculated for all of the records. In instances where the categories cannot be compared with each other, they are assigned special numeric values such that the distance for that field is the same between all categories. If there are very few categories, then separate binary indicators for each category can also be created to avoid inherent ordering of numbers.

After the numeric conversion process is complete, every field of the records is assigned a relative weight in step 340. The weight for some attributes can be changed to assign relative importance to the different attributes while forming the clusters of similar records. Next, the weighted records are processed in normalization step 350, wherein the values of all the attributes of the records are normalized so that the mean of all records is 0 with a variance of 1. This results in normalized vectors. The normalized vectors are then compared with the original records, e.g., the original dataset, to obtain mapping tables for each attribute. The mapping tables are used for remapping during the original domain mapping step 250 in FIG. 2. After the application of each of these steps, a normalized vector mapped dataset is obtained in step 360, which can be used for clustering and perturbation. The vector space mapping program is completed at the stop step 370.

Figure 4:
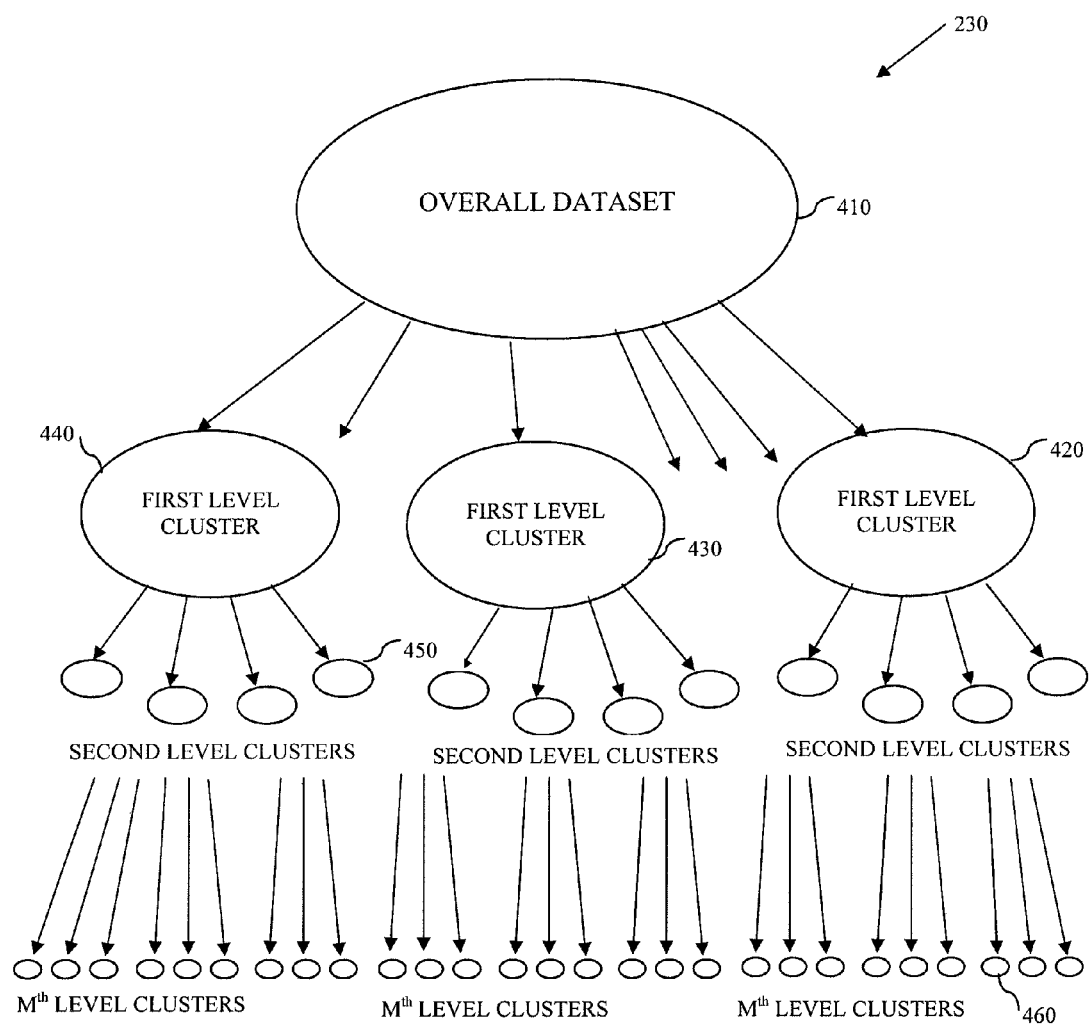
FIG. 4 is a diagram illustrating hierarchical clustering performed by the system.

FIG. 4 is a diagram illustrating the hierarchical clustering step 230 of FIG. 2 in greater detail. At each level of clustering, similar records are grouped in the same cluster, while dissimilar records are assigned to different clusters. The normalized vector mapped dataset is provided in the clustering step 230 as an overall dataset 410. The overall dataset 410 is first divided into disjointed first-level clusters based on a clustering technique. In one embodiment, the clustering technique involves forming the first-level clusters 420, 430, and 440 by dividing the entirety of the overall dataset 410 into disjointed subsets according to unique values of some of the dataset's attributes. The first-level clusters 420, 430, and 440 can be broken down further into second level clusters 450 or subsequent $M^{th}$ level clusters 460 based on other attributes until the desired cluster size is achieved. In fixed-size clustering, the Euclidean distance metric can be used to calculate the distance between all normalized vectors in a cluster. The time required for finding the pair-wise distance between all normalized vectors in a cluster increases as the number of levels of clusters increases. Once all the pair-wise distances are obtained, a k-nearest neighbor approach can be used to divide the cluster into groups of size k. These k-sized clusters can then be anonymized using perturbation methods, discussed below.

FIG. 5 is a diagram illustrating a sample record-level dataset 500 containing three 4-sized clusters 510, 520, and 530, obtained after the hierarchical clustering step 230 and prior to perturbation step 240. As can be seen, the record-level dataset 500 contains information about diseases affecting individuals according to their location, age, and nationality. The subset 500 is obtained after first-level clustering of the original dataset 110. As an example, the original dataset 110 may contain information about patients in many hospitals, and the first-level clustering may divide the entire dataset into subsets, e.g., first-level clusters for each hospital. A second-level clustering may then be based on the distance between all records, with the subsets being divided into disjointed clusters having four entries, using a nearest four neighbor approach. As shown, the illustrated dataset includes three second-level clusters 510, 520, and 530, each having four entries. To better illustrate the perturbation techniques, this dataset is not converted to vector space, as would normally be done.

FIG. 6 is a diagram illustrating a first anonymized dataset 600 obtained after applying a first embodiment of the perturbation step 240 of FIG. 2 on the dataset 500 of FIG. 5. This embodiment can be referred to as an "assign" method. The assign method achieves k-anonymity in a k-sized cluster (here, 4-sized) by randomly assigning the attribute value of one record to all the records in that cluster. For example, the first cluster 510 of FIG. 5 is converted to an anonymized cluster 610 by assigning the circled values in the first cluster 510 to all the records of the first cluster, resulting in the first anonymized cluster 610. This is done for quasi-identifiers, which are the set of attributes that can be linked with external datasets to identify individuals. In the current example, zip code, age, and nationality are quasi-identifiers, while disease is a sensitive attribute. Similarly, the second and third clusters 520, 530 of FIG. 5 are converted to second and third anonymized clusters 620, 630 of FIG. 6 by applying the assign method. The disjointed anonymized clusters 610, 620, and 630 are then combined to obtain the anonymized dataset at the first subset level. This first method achieves k-anonymity and re-assigns values to the attributes only from similar records, thereby preserving the original statistical properties of the data. This is in contrast to generalization methods of the prior art that may entail a significant loss of information and may not be able to achieve k-anonymity.

FIG. 7 is a diagram illustrating a second anonymized dataset 700 obtained after applying a second embodiment of the perturbation step 240 of FIG. 2 on the dataset 500 of FIG. 5. This embodiment can be referred to as a "shuffle" method. In the shuffle method, the values of an attribute are shuffled among the records in each k-sized cluster (here, 4-sized) by a random permutation. For example, the first cluster 510 is converted to a first anonymized cluster 710 by randomly shuffling the record values among each other. The shuffling is done only for quasi-identifiers, as in the case of assign method, described above. Similarly, the second and third clusters 520, 530 of FIG. 5 are converted to second and third anonymized clusters 720, 730 of FIG. 7. While this second method does not achieve k-anonymity, it is still advantageous for at least two reasons. First, it does not change the attribute-wise statistical distributions of data within each cluster; and second, it preserves the statistical relationships between different attributes, such as relationships between income and education qualifications, which may be lost in general perturbation-based approaches of the prior art. Moreover, since the perturbed records do not belong to any individual, the risk of identification reduces significantly.

Both the assign embodiment of anonymization and the shuffle embodiment of anonymization allow the user to specify the relative importance of various attributes while determining the similarity between the records. For example, in some instances, the gender attribute might be an important discriminator. In such cases, either the first-level clustering could be based on gender, or the gender attribute may be assigned a higher relative weight so that the clustering algorithm tends to assign the records with a different gender into different clusters. Similarly, in another dataset where the age attribute is of heightened importance, it can be afforded a greater weight to reflect this greater importance.

Figure 8:
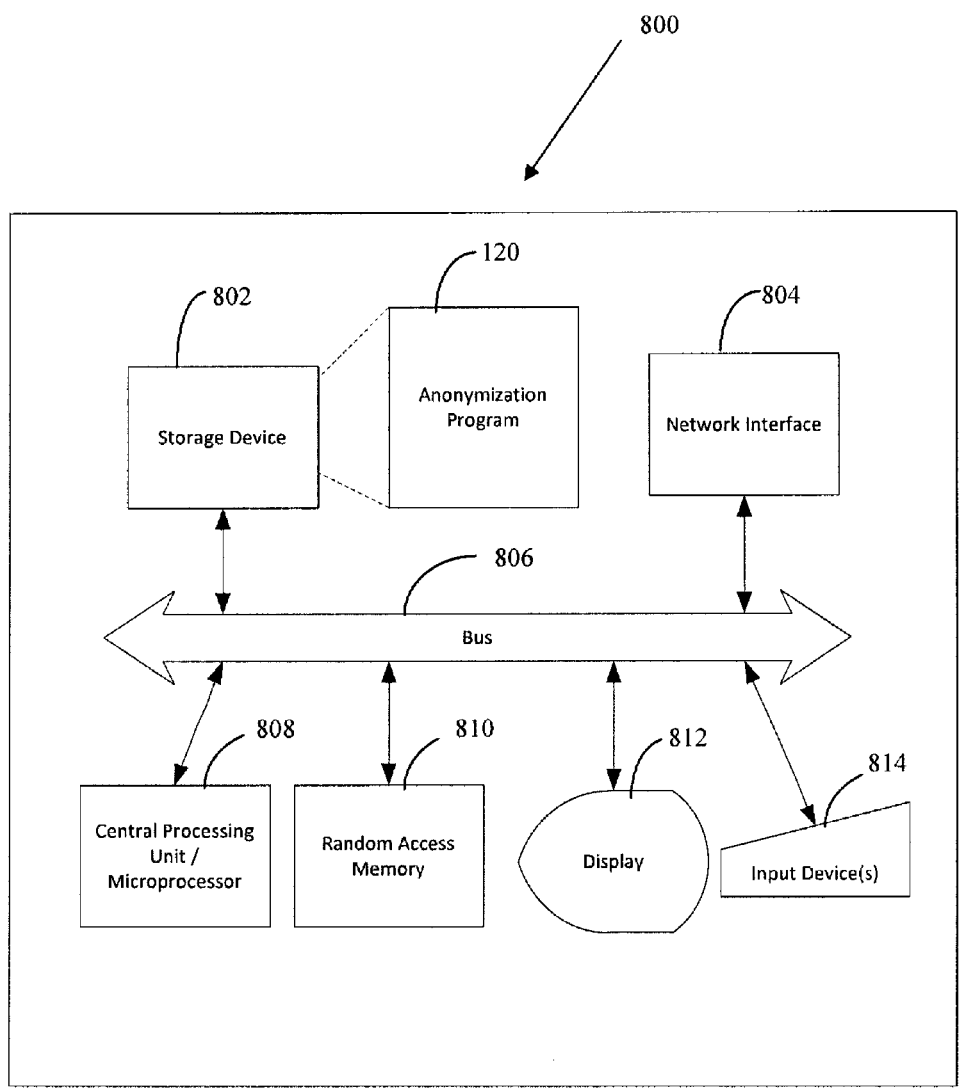
FIG. 8 is a diagram illustrating components of a sample computer system in which the system could be implemented.

FIG. 8 is a diagram showing hardware and software/firmware components of a computer system 800 in which the anonymization program or engine 120 could be implemented. The computer system 800 could include a non-volatile storage device 802 which stores the anonymization program 120, a network interface 804, a bus 806, a central processing unit 808, a random access memory 810, a display 812, and one or more input devices 814. The storage device 802 could comprise any suitable, non-volatile, computer-readable storage medium capable of storing the anonymization program 120 of the present invention, such as a disk and/or non-volatile memory (e.g., read-only memory (ROM), erasable programmable ROM (EPROM), electrically-erasable programmable ROM (EEPROM), flash memory, field-programmable gate array (FPGA), etc.). The network interface 804 could include any suitable type of network device for allowing the computer system 800 to communicate with the Internet or a network of computers, such as a wired or wireless Ethernet transceiver, etc. The central processing unit 808 could include any suitable single- or multiple-core microprocessor of any suitable architecture, such as an Intel processor, AMD microprocessor, SPARC microprocessor, etc., that is capable of implementing and running the anonymization program 120. The random access memory 810 could include any suitable, high-speed, random access memory typical of most modern computers, such as dynamic RAM (DRAM), etc. The display 812 could be any suitable computer display, such as a liquid crystal display (LCD), touchscreen, cathode ray tube (CRT), etc. The input device 814 could be any suitable user input device, such as a keyboard, mouse, touchpad, touchscreen, trackball, scroll wheel, motion sensitive control, scanner, etc. The input device 814 may be used by a user to input the original dataset 110 into the computer system 800, or to alter the anonymization program settings 120. For example, the input device 814 may allow a user to alter the weight of a particular attribute of the original dataset 110, set the level of clustering, and/or choose which perturbation method, e.g., the assign or shuffle method, he/she wishes to implement.

The anonymization systems/methods described herein can be used to convert a high-dimensional dataset into an anonymized dataset. Further, the systems/methods can be incorporated into business processes where sensitive data is involved and identity disclosure may result in unpleasant consequences. The systems/methods disclosed herein will thus lead to more transparency in the processes without compromising the privacy of the subjects.

Further, anonymization of data is a vital step for many government organizations which are required to publicly release data containing information of the citizens, such as population census and health care data. Sometimes, private organizations release their sensitive data to the public for machine learning competitions to improve their business practice. Anonymization of data can help these government and private organizations achieve their objective and maintain confidentiality of the publicly released data.

Having thus described the invention in detail, it is to be understood that the foregoing description is not intended to limit the spirit or scope thereof. It will be understood that the embodiments of the present invention described herein are merely exemplary and that a person skilled in the art may make many variations and modification without departing from the spirit and scope of the invention. All such variations and modifications, including those discussed above, are intended to be included within the scope of the invention. What is desired to be protected is set forth in the following claims.

What is claimed is:
1. A system for data anonymization comprising:
a computer system for electronically receiving an original dataset and allowing a user to specify a relative importance of at least one attribute of the dataset; and
an anonymization program executed by the computer system for producing an anonymized dataset from the original dataset, the anonymization program executing:

a vector space mapping sub-process for converting each record of the original dataset to a normalized vector that can be compared to other vectors;

a hierarchical clustering sub-process for dividing the normalized vectors into disjointed k-sized groups of similar records based on a hierarchical clustering technique;

a perturbation sub-process for generating anonymized clusters from individual clusters generated by the hierarchical clustering sub-process; and an original domain mapping sub-process to combine and remap anonymized clusters back to an original domain of the original dataset.

2. The system of claim 1, wherein the original dataset is a high-dimensional dataset containing record-level data.

3. The system of claim 1, wherein the vector space mapping sub-process executes a categorical to numeric conversion process.

4. The system of claim 1, wherein the vector space mapping sub-process assigns a relative weight to every field of the records.

5. The system of claim 4, wherein the vector space mapping sub-process normalizes the weighted records to produce the normalized vectors, which are compared with the original records to obtain mapping tables for each attribute.

6. The system of claim 1, wherein the vector space mapping sub-process produces a normalized vector mapped dataset.

7. The system of claim 1, wherein the hierarchical clustering sub-process divides the normalized vector mapped dataset into first-level clusters.

8. The system of claim 1, wherein the hierarchical clustering sub-process breaks down each first-level cluster into subsequent M-th level clusters based on attributes.

9. The system of claim 1, wherein the perturbation sub-process randomly assigns attribute values of one record to all records within each cluster.

10. The system of claim 1, wherein the perturbation sub-process shuffles the values of an attribute among the records in each cluster by a random permutation.

11. A method for data anonymization comprising:
electronically receiving an original dataset at a computer system;
allowing a user to specify a relative importance of at least one attribute of the dataset; and
executing by the computer system an anonymization program for producing an anonymized dataset from the original dataset, the anonymization program executing:
a vector space mapping sub-process for converting each record of the original dataset to a normalized vector that can be compared to other vectors;
a hierarchical clustering sub-process for dividing the normalized vectors into disjointed k-sized groups of similar records based on a hierarchical clustering technique;
a perturbation sub-process for generating anonymized clusters from individual clusters generated by the hierarchical clustering sub-process; and
an original domain mapping sub-process to combine and remap anonymized clusters back to an original domain of the original dataset.

12. The method of claim 11, wherein the original dataset is a high-dimensional dataset containing record-level data.

13. The method of claim 11, wherein the vector space mapping sub-process executes a categorical to numeric conversion process.

14. The method of claim 11, wherein the vector space mapping sub-process assigns a relative weight to every field of the records.

15. The method of claim 14, wherein the vector space mapping sub-process normalizes the weighted records to produce the normalized vectors, which are compared with the original records to obtain mapping tables for each attribute.

16. The method of claim 11, wherein the vector space mapping sub-process produces a normalized vector mapped dataset.

17. The method of claim 11, wherein the hierarchical clustering sub-process divides the normalized vector mapped dataset into first-level clusters.

18. The method of claim 11, wherein the hierarchical clustering sub-process breaks down each first-level cluster into subsequent M-th level clusters based on attributes.

19. The method of claim 11, wherein the perturbation sub-process randomly assigns attribute values of one record to all records within each cluster.

20. The method of claim 11, wherein the perturbation sub-process shuffles the values of an attribute among the records in each cluster by a random permutation.

21. A computer-readable medium having computer-readable instructions stored thereon which, when executed by a computer system, cause the computer system to perform the steps of:
electronically receiving an original dataset at a computer system;
allowing a user to specify a relative importance of at least one attribute of the dataset; and
executing by the computer system an anonymization program for producing an anonymized dataset from the original dataset, the anonymization program executing:
a vector space mapping sub-process for converting each record of the original dataset to a normalized vector that can be compared to other vectors;
a hierarchical clustering sub-process for dividing the normalized vectors into disjointed k-sized groups of similar records based on a hierarchical clustering technique;
a perturbation sub-process for generating anonymized clusters from individual clusters generated by the hierarchical clustering sub-process; and
an original domain mapping sub-process to combine and remap anonymized clusters back to an original domain of the original dataset.

22. The computer-readable medium of claim 21, wherein the original dataset is a high-dimensional dataset containing record-level data.

23. The computer-readable medium of claim 21, wherein the vector space mapping sub-process executes a categorical to numeric conversion process.

24. The computer-readable medium of claim 21, wherein the vector space mapping sub-process assigns a relative weight to every field of the records.

25. The computer-readable medium of claim 24, wherein the vector space mapping sub-process normalizes the weighted records to produce the normalized vectors, which are compared with the original records to obtain mapping tables for each attribute.

26. The computer-readable medium of claim 21, wherein the vector space mapping sub-process produces a normalized vector mapped dataset.

27. The computer-readable medium of claim 21, wherein the hierarchical clustering sub-process divides the normalized vector mapped dataset into first-level clusters.

28. The computer-readable medium of claim 21, wherein the hierarchical clustering sub-process breaks down each first-level cluster into subsequent M-th level clusters based on attributes.

29. The computer-readable medium of claim 21, wherein the perturbation sub-process randomly assigns attribute values of one record to all records within each cluster.

30. The computer-readable medium of claim 21, wherein the perturbation sub-process shuffles the values of an attribute among the records in each cluster by a random permutation.

* * * * *